US011745823B2

(12) United States Patent
Tsai et al.

(10) Patent No.: US 11,745,823 B2
(45) Date of Patent: Sep. 5, 2023

(54) BICYCLE BRAKING AND PARKING DEVICE

(71) Applicant: TEKTRO TECHNOLOGY CORPORATION, Changhua County (TW)

(72) Inventors: Szu-Fang Tsai, Changhua County (TW); Chao-Kung Chen, Changhua County (TW); Wei-Cheng Chao, Changhua County (TW)

(73) Assignee: TEKTRO TECHNOLOGY CORPORATION, Changhua County (TW)

( * ) Notice: Subject to any disclaimer, the term of this patent is extended or adjusted under 35 U.S.C. 154(b) by 65 days.

(21) Appl. No.: 17/500,280

(22) Filed: Oct. 13, 2021

(65) Prior Publication Data

US 2022/0111925 A1    Apr. 14, 2022

(30) Foreign Application Priority Data

Oct. 14, 2020 (TW) ................................ 109135540

(51) Int. Cl.
 *B62L 1/02* (2006.01)
 *B62L 1/00* (2006.01)
(52) U.S. Cl.
 CPC ............. *B62L 1/02* (2013.01); *B62L 1/005* (2013.01)
(58) Field of Classification Search
 CPC ...... E05B 15/102; E05B 67/36; E05C 19/184; F16D 63/006; F16D 2121/16; F16D 2121/20; B62H 5/18; B62H 5/141; B62K 19/38; B62K 21/02; B62L 1/02; B62L 1/005; B62L 3/023; B60T 1/005; B60T 7/085; B60T 8/3225; B60T 13/741
 (Continued)

(56) References Cited

U.S. PATENT DOCUMENTS

2008/0041127 A1* 2/2008 Xavier ................. B62H 5/18
 70/228
2008/0053766 A1* 3/2008 Costa .................... B62H 5/18
 188/344
 (Continued)

FOREIGN PATENT DOCUMENTS

CN   201980365 U   *  9/2011
CN   111412232 A   *  7/2020  ............. B62K 19/38
GB    2310839 A   *  9/1997  ............. B60R 25/08

*Primary Examiner* — Robert A. Siconolfi
*Assistant Examiner* — San M Aung
(74) *Attorney, Agent, or Firm* — Maschoff Brennan

(57) ABSTRACT

A bicycle braking and parking device includes a casing, two brake pads, a locking pin, and an electromagnetic driver. The casing has an accommodation space and two pistons located at two opposite sides of the accommodation space. The accommodation space can accommodate part of a brake disk. The brake pads are located at the accommodation space and located between the pistons. The pistons can push the brake pads, and the brake pads can clamp the brake disk. The locking pin is movably disposed on the casing. The electromagnetic driver can force the locking pin to move between a released position and a locked position. when the locking pin is in the released position, the locking pin is separated from the brake disk. When the locking pin is in the locked position, the locking pin is inserted into the brake disk to limit a motion of the brake disk.

9 Claims, 18 Drawing Sheets

(58) Field of Classification Search
USPC .......................................................... 188/26
See application file for complete search history.

(56) References Cited

U.S. PATENT DOCUMENTS

2017/0219032 A1* 8/2017 Tai ............................ B62L 1/00
2018/0265153 A1* 9/2018 Kondou .................. B62L 1/005

* cited by examiner

BICYCLE BRAKING AND PARKING DEVICE

CROSS-REFERENCE TO RELATED APPLICATIONS

This non-provisional application claims priority under 35 U.S.C. § 119(a) on Patent Application No(s). 109135540 filed in Taiwan, R.O.C. on Oct. 14, 2020, the entire contents of which are hereby incorporated by reference.

TECHNICAL FIELD

The disclosure relates to a braking and parking device, more particularly to a bicycle braking and parking device.

BACKGROUND

In recent years, road bikes, mountain bikes and other types of bicycles become popular. This motivates bicycle manufacturers to pay more attention on improving their products.

It might need to take a break while riding a bicycle up a slope. Normally, a rider would park the bicycle at roadside, but the rider has to keep holding the brake lever, or the inclination angle of the slope would still cause the bicycle to slide down the slope itself. This situation makes the rider unable to leave the bicycle for other activities and therefore causes inconvenience.

SUMMARY

The disclosure provides a bicycle braking and parking device capable of preventing the bicycle from moving while parking on a slope.

One embodiment of the disclosure provides a bicycle braking and parking device. The bicycle braking and parking device is configured to hold a brake disk. The bicycle braking and parking device includes a casing, two brake pads, a locking pin, and an electromagnetic driver. The casing has an accommodation space and two pistons. The accommodation space is configured to accommodate part of the brake disk, and the pistons are respectively located at two opposite sides of the accommodation space. The brake pads are located at the accommodation space and between the pistons. The pistons are configured to push the brake pads, and the brake pads are configured to clamp the brake disk. The locking pin is movably disposed on the casing. The electromagnetic driver is configured to force the locking pin to move between a released position and a locked position. when the locking pin is in the released position, the locking pin is configured to be separated from the brake disk. When the locking pin is in the locked position, the locking pin is configured to be inserted into the brake disk so as to limit a motion of the brake disk.

Another embodiment of the disclosure provides a bicycle braking and parking device. The bicycle braking and parking device is configured to clamp a brake disk and connected to a brake lever. The bicycle braking and parking device includes a casing, two first pistons, two second pistons, two first brake pads, two second brake pads, and a driving piston. The casing has a first inlet channel, two first chambers, a second inlet channel, two second chambers, and a third chamber. The first inlet channel is in fluid communication with the first chambers. The second inlet channel, the second chambers, and the third chamber are in fluid communication with each other. The first inlet channel and the first chambers are not in fluid communication with the second inlet channel, the second chambers, and the third chamber. The first inlet channel is configured to be in fluid communication with the brake lever. The first pistons are respective located in the first chambers. The second pistons are respectively located in the second chambers. The first brake pads are located between the first pistons. The second brake pads are located between the second pistons. The driving piston is movably located in the third chamber. The driving piston is configured to cause oil in the third chamber, the second inlet channel, and the second chambers to trigger the second pistons to push the second brake pads to clamp the brake disk.

According to the bicycle braking and parking devices as disclosed in the above embodiments, while the brake lever is released, the motion of the wheel can still be limited by inserting the locking pin through the brake disk or using the driving piston to hold the brake pad. This allows the bicycle parked on a slope to stay stationary even if the brake lever is released.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
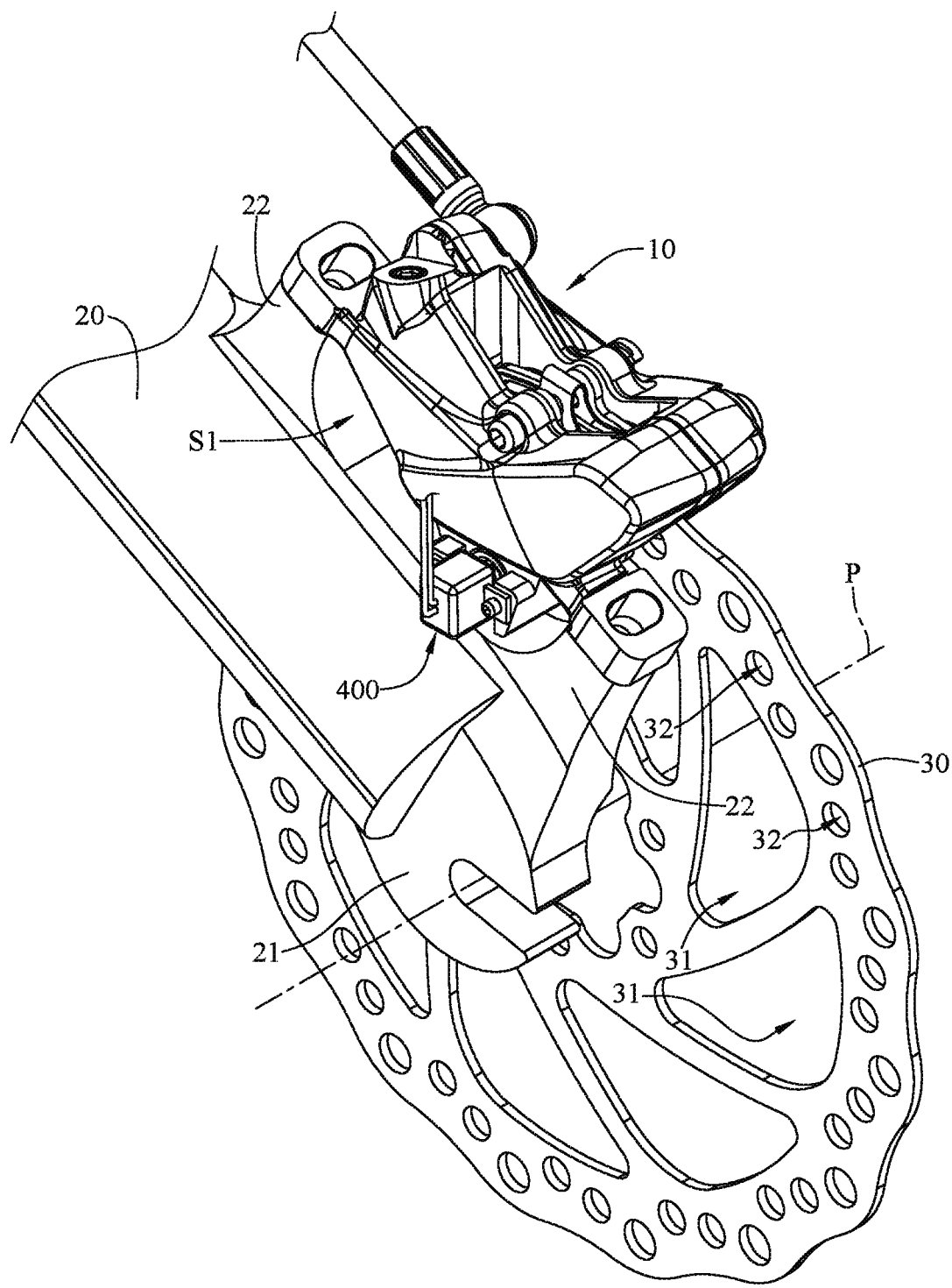
FIG. 1 is a perspective view of a bicycle braking and parking device according to a first embodiment of the disclosure, a brake disk, and a bicycle fork.
Figure 2:
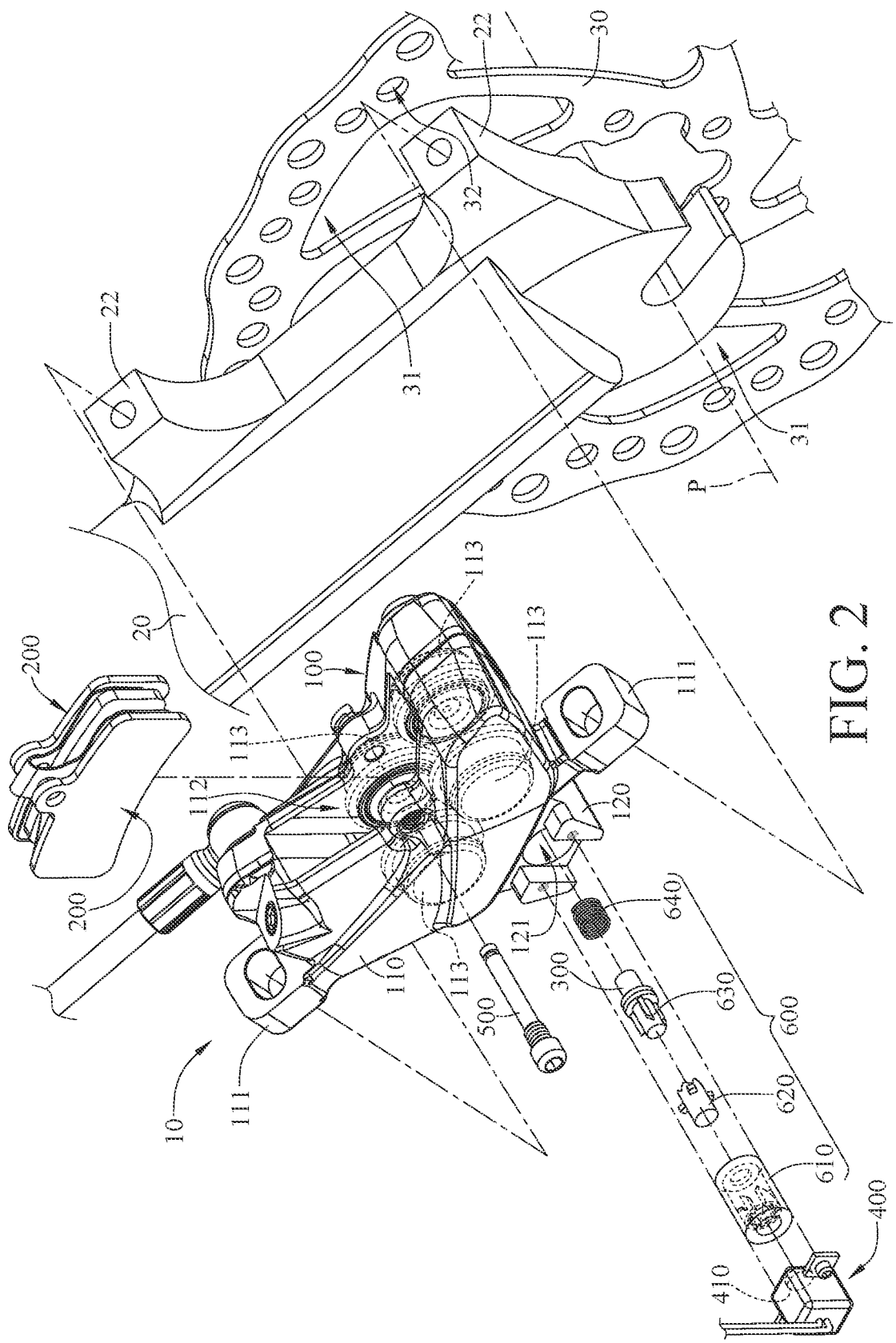
FIG. 2 is an exploded view of the bicycle braking and parking device, the brake disk, and the bicycle fork in FIG. 1.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Referring to FIGS. 1 to 4, there are shown a perspective view, an exploded view, a side view, and a partial cross-sectional view of a bicycle braking and parking device 10 according to a first embodiment of the disclosure, a brake disk 30, and a bicycle fork 20.

In this embodiment, the bicycle braking and parking device 10 is configured to be mounted on the bicycle fork 20 and adapted to act on a brake disk 30. The bicycle fork 20 is, for example, a front fork. The bicycle fork 20 has a mount portion 21 and two protrusion portions 22. The mount portion 21 is configured to assembled with a wheel (not shown). The protrusion portions 22 are configured to be assembled with the bicycle braking and parking device 10. The brake disk 30 is configured to be fixed to the wheel. The brake disk 30 has a plurality of first vent holes 31 and a plurality of second vent holes 32. The sizes of the first vent holes 31 are greater than that of the second vent holes 32, and the first vent holes 31 are located closer to an axis P of the brake disk 30 than the second vent holes 32.

The bicycle braking and parking device 10 includes a casing 100, two brake pads 200, a locking pin 300, and an electromagnetic driver 400. In this or another embodiment, the bicycle braking and parking device 10 may further include an insertion pin 500 and a push-push mechanism 600.

Figure 3:
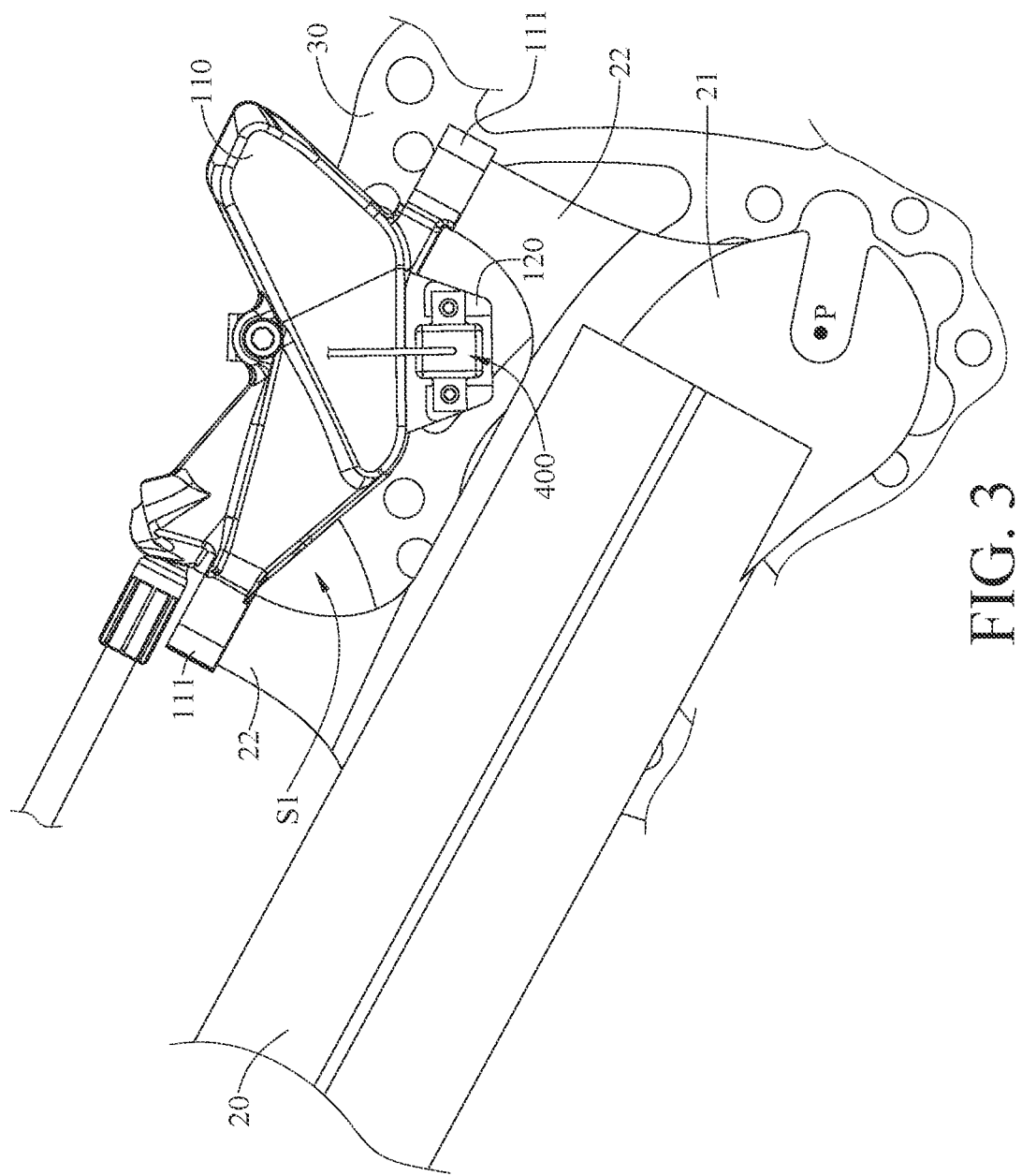
FIG. 3 is a side view of the bicycle braking and parking device, the brake disk, and the bicycle fork in FIG. 1.

The casing 100 includes a main part 110 and an extension part 120 connected to each other. The main part 110 has two tab portions 111. The tab portions 111 are respectively fixed to two protrusion portions 22 of the bicycle fork 20. The extension part 120 is configured to be located between the protrusion portions 22 of the bicycle fork 20 and located between the main part 110 and the mount portion 21 of the bicycle fork 20. As shown in FIG. 3, the extension part 120 is further located in a space 51 formed by the main part 110 and the bicycle fork 20. The main part 110 of the casing 100 further has an accommodation space 112 and a plurality of pistons 113. The accommodation space 112 is configured to accommodate part of the brake disk 30, and two of the pistons 113 are located at a side of the accommodation space 112, and the other two of the pistons 113 are located at another side of the accommodation space 112.

The brake pads 200 are located in the accommodation space 112 and mounted to the main part 110 of the casing 100 by the insertion pin 500 inserting through the brake pads 200 and the main part 110. The brake pads 200 are located between two of the pistons 113 and also located between the other two of the pistons 113. The brake pads 200 are configured to be pushed by the pistons 113 so as to clamp the brake disk 30.

Note that the quantity of the pistons 113 in other embodiments may be two, and these two pistons 113 are respectively located at two opposite sides of the accommodation space 112.

In this embodiment, the extension part 120 has a through hole 121, and the through hole 121 is configured to correspond to one of the first vent holes 31 of the brake disk 30. The push-push mechanism 600 is disposed in the through hole 121 of the extension part 120. The push-push mechanism 600 includes a guide sleeve 610, a slidable component 620, a rotatable component 630, and an elastic component 640. In this embodiment, the push-push mechanism 600 may have a similar configuration similar to that used in a retractable pen, and thus the connection and functions of the guide sleeve 610, the slidable component 620, the rotatable component 630, and the elastic component 640 will not be described in detail hereinafter.

The locking pin 300 is connected to the rotatable component 630 of the push-push mechanism 600. The electromagnetic driver 400 is fixed to the extension part 120 of the casing 100, and the electromagnetic driver 400 is, for example, electrically connected to a parking control switch (not shown). The electromagnetic driver 400 has a pushing part 410, and the pushing part 410 is configured to trigger the push-push mechanism 600 so as to force the locking pin 300 to move between a released position and a locked position.

Figure 4:
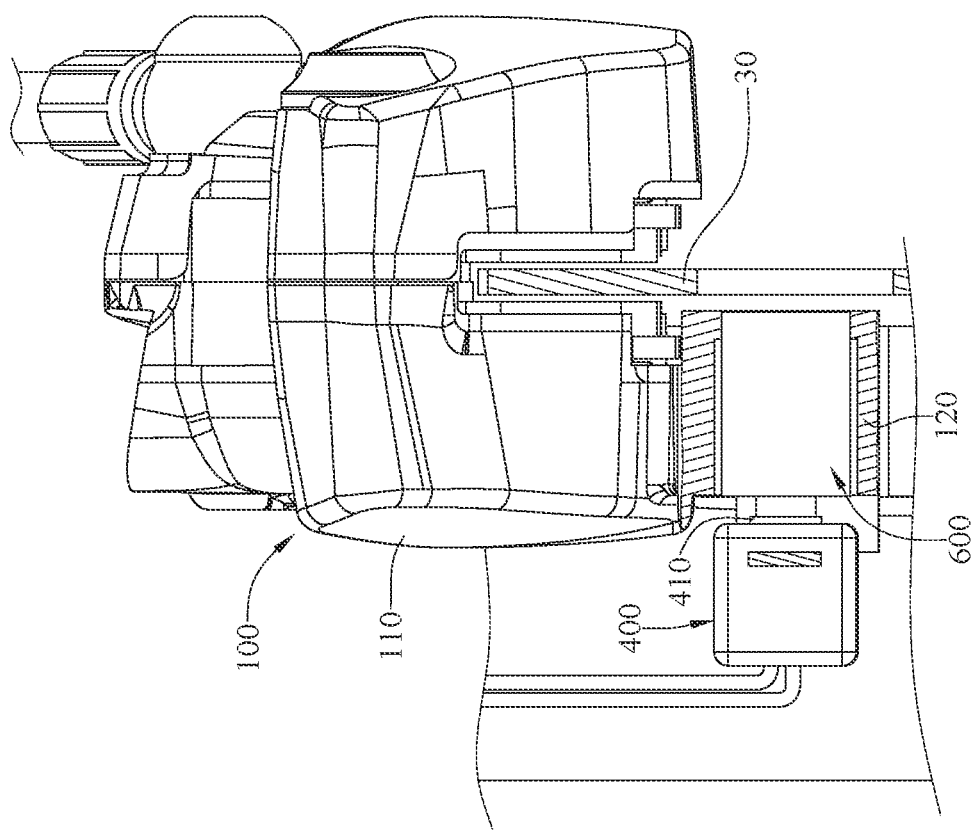
FIG. 4 is a partial cross-sectional view the bicycle braking and parking device, the brake disk, and the bicycle fork in FIG. 1.

As shown in FIG. 4, when the locking pin 300 is in the released position, the locking pin 300 (as shown in FIG. 3) does not protrude out of the extension part 120 of the casing 100 and does not interfere with the brake disk 30. At this moment, the motion of the brake disk 30 is not limited by the locking pin 300.

Figure 5:
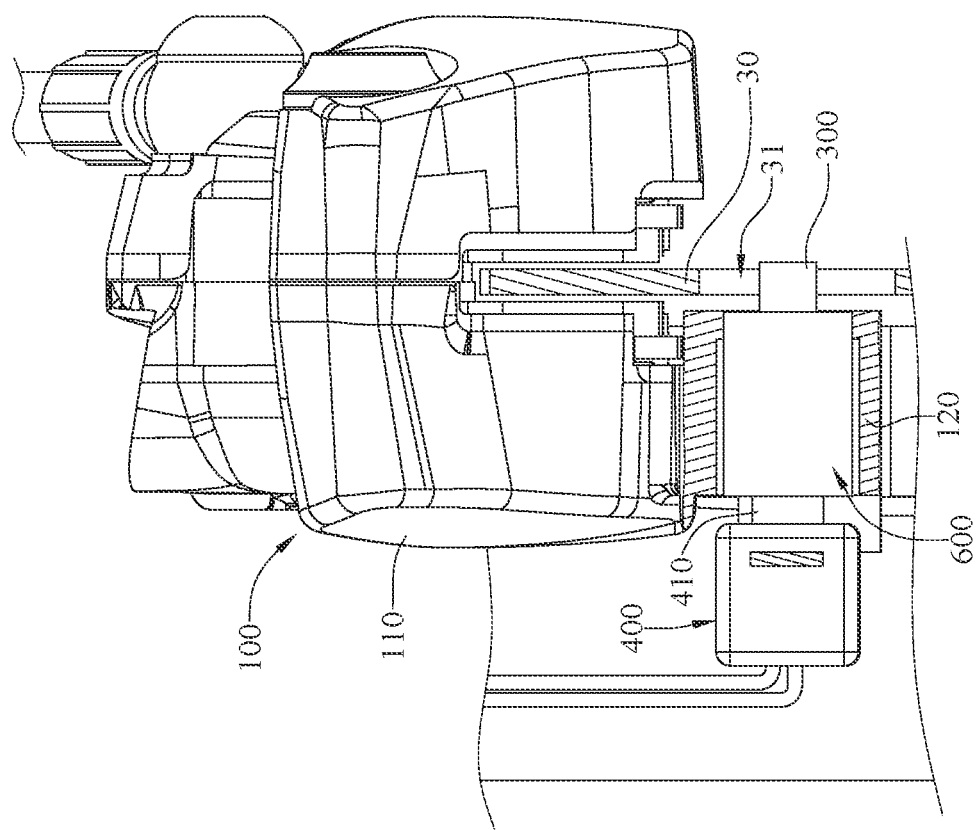
FIG. 5 is a partial cross-sectional view the bicycle braking and parking device, the brake disk, and the bicycle fork in FIG. 1 when a locking pin is in a locked position.

Then, referring to FIG. 5, there is shown a partial cross-sectional view the bicycle braking and parking device 10, the brake disk 30, and the bicycle fork 20 in FIG. 1 when the locking pin 300 is in a locked position.

When the parking control switch is turned on, the pushing part 410 of the electromagnetic driver 400 activates the push-push mechanism 600 so as to moves the locking pin 300 towards the brake disk 30, thus causing at least part of the locking pin 300 to protrude out of the extension part 120 of the casing 100. At this moment, the locking pin 300 is in the locked position and is disposed through one of the first vent holes 31 of the brake disk 30, such that the motion of the brake disk 30 is limited by the locking pin 300. As a result, the wheel is locked. As such, when the bicycle is parked on a slope, the locked position of the locking pin 300 is able to prevent unwanted movement of the wheel even if the brake lever is released.

Due to the function of the push-push mechanism 600, one more push of the push-push mechanism 600 by the parking control switch can restore the locking pin 300 back to the released position and therefore release the brake disk 30.

In other embodiments, the locking pin, the extension part of the casing, the push-push mechanism, and the electromagnetic driver may be rearranged to suitable places that allow the locking pin to insert through the second vent hole of the brake disk. Note that any typical push-push locking mechanism can be employed as the push-push mechanism of the disclosure. Note that the electromagnetic driver 400 in other embodiments may be controlled using a mobile device (e.g., a smartphone).

Figure 6:
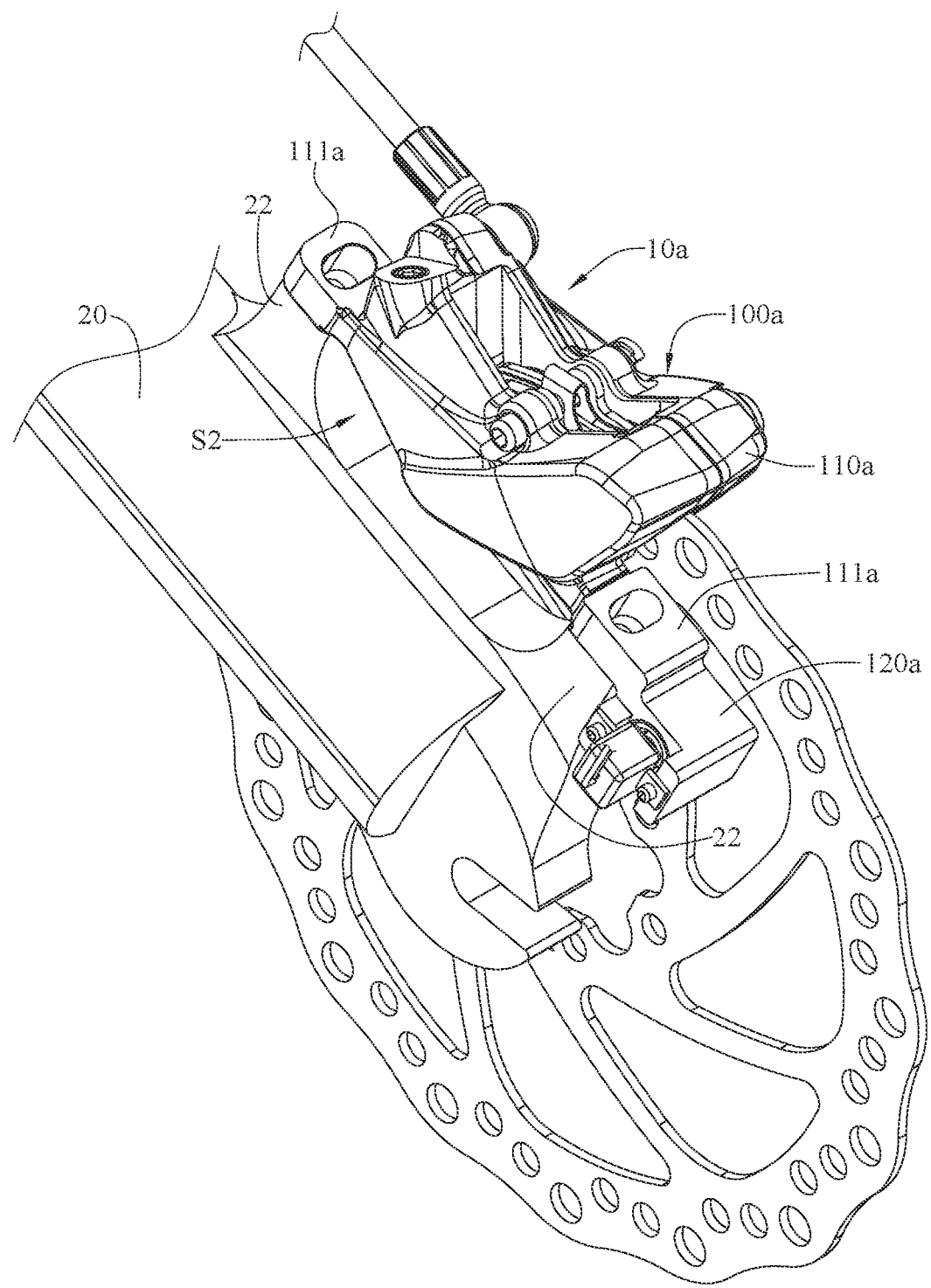
FIG. 6 is a perspective view of a bicycle braking and parking device according to a second embodiment of the disclosure, a brake disk, and a bicycle fork.

Then, referring to FIG. 6, there is shown a perspective view of a bicycle braking and parking device 10a according to a second embodiment of the disclosure, a brake disk, and a bicycle fork 20. The bicycle braking and parking device 10a is similar to the bicycle braking and parking device 10 discussed in the previous embodiment, thus the following paragraphs mainly relate to the differences between them.

In this embodiment, an extension part 120a of a casing 100a is connected to a side of one of two tab portions 111a of a main part 110a located away from the other one of the tab portions 111a, and the extension part 120a is configured to be located at a side of one of the protrusion portions 22 of the bicycle fork 20 located away from the other one of the protrusion portions 22. As shown in FIG. 6, the extension part 120a is located outside a space S2 formed by the main part 110a and the bicycle fork 20, and components (e.g., the push-push mechanism 600 and the locking pin 300 shown in FIG. 2) disposed on the extension part 120a is also located outside the space S2 formed by the main part 110a and the bicycle fork 20.

Figure 7:
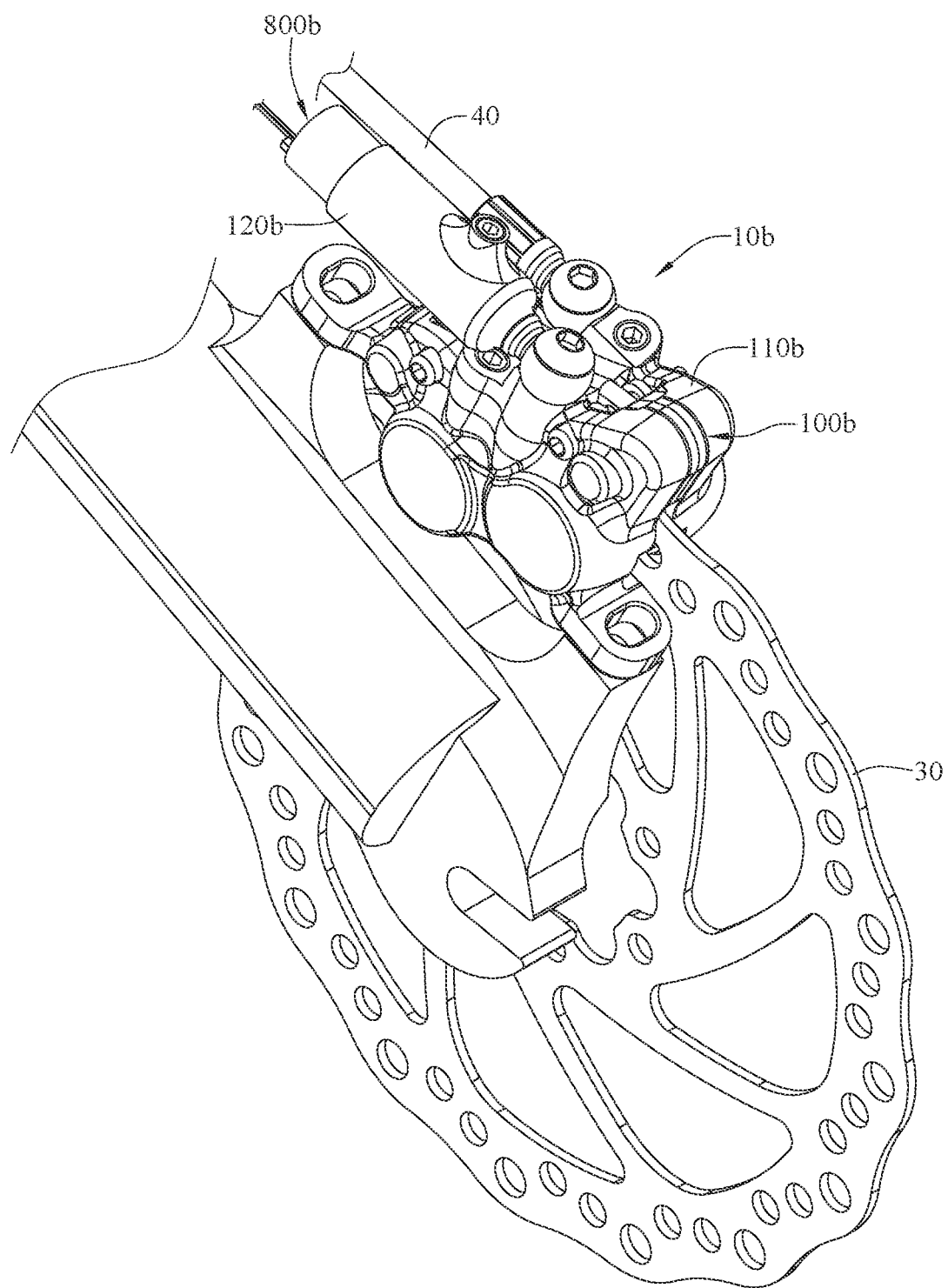
FIG. 7 is a perspective view of a bicycle braking and parking device according to a third embodiment of the disclosure, a brake disk, and a bicycle fork.
Figure 8:
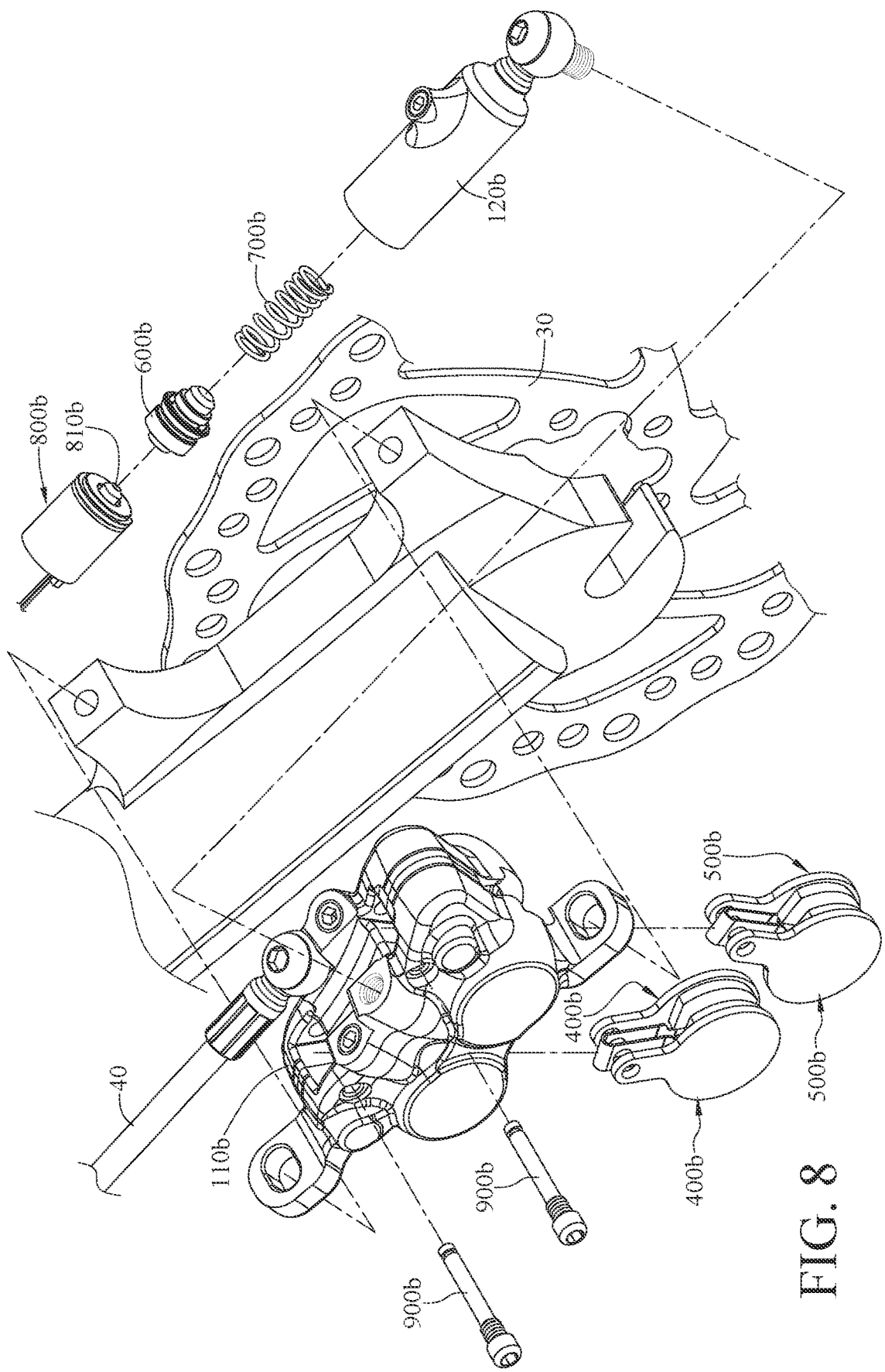
FIG. 8 is an exploded view of the bicycle braking and parking device, the brake disk, and the bicycle fork in FIG. 7.
Figure 9:
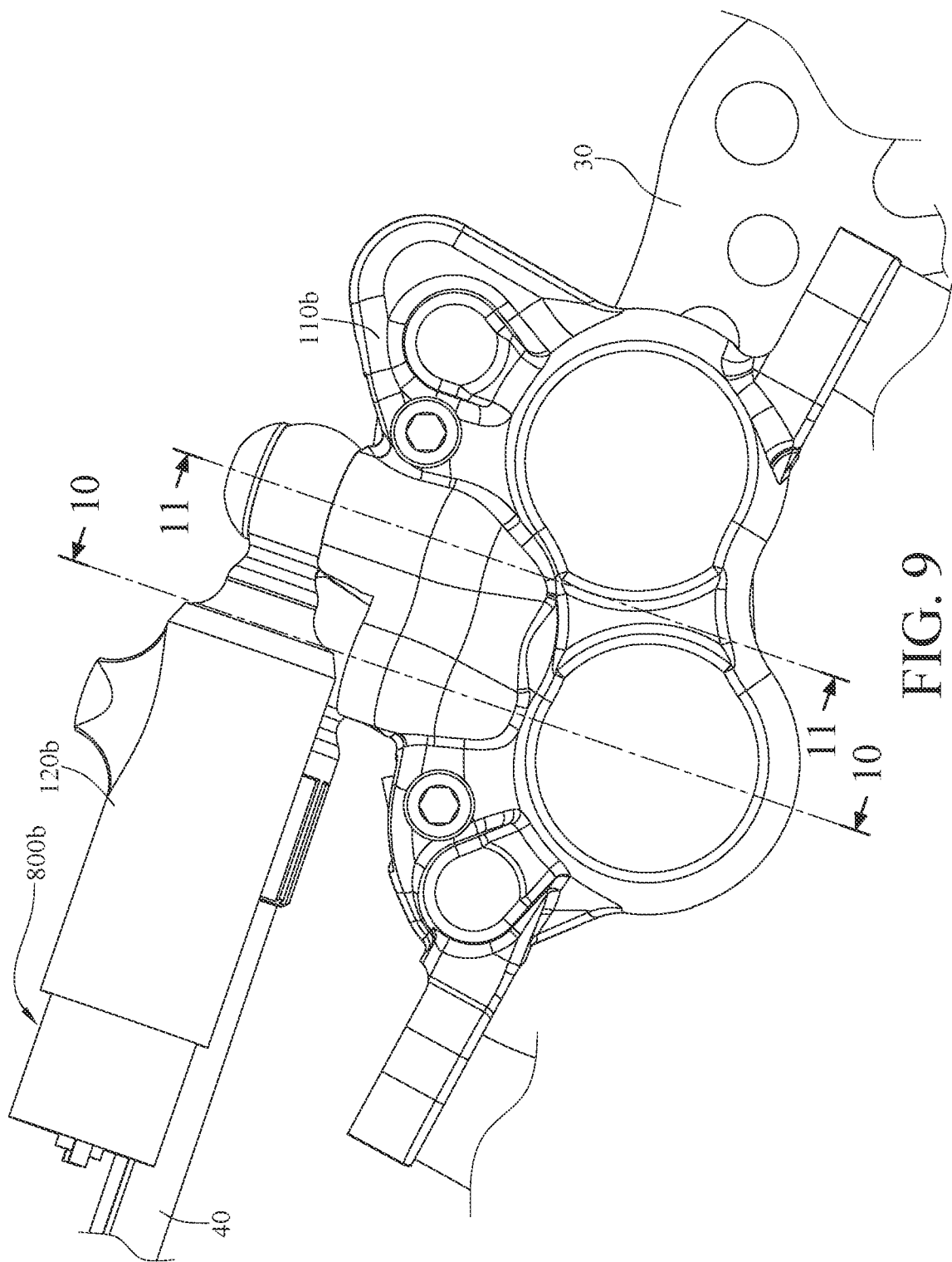
FIG. 9 is a side view of the bicycle braking and parking device, the brake disk, and the bicycle fork in FIG. 7.
Figure 10:
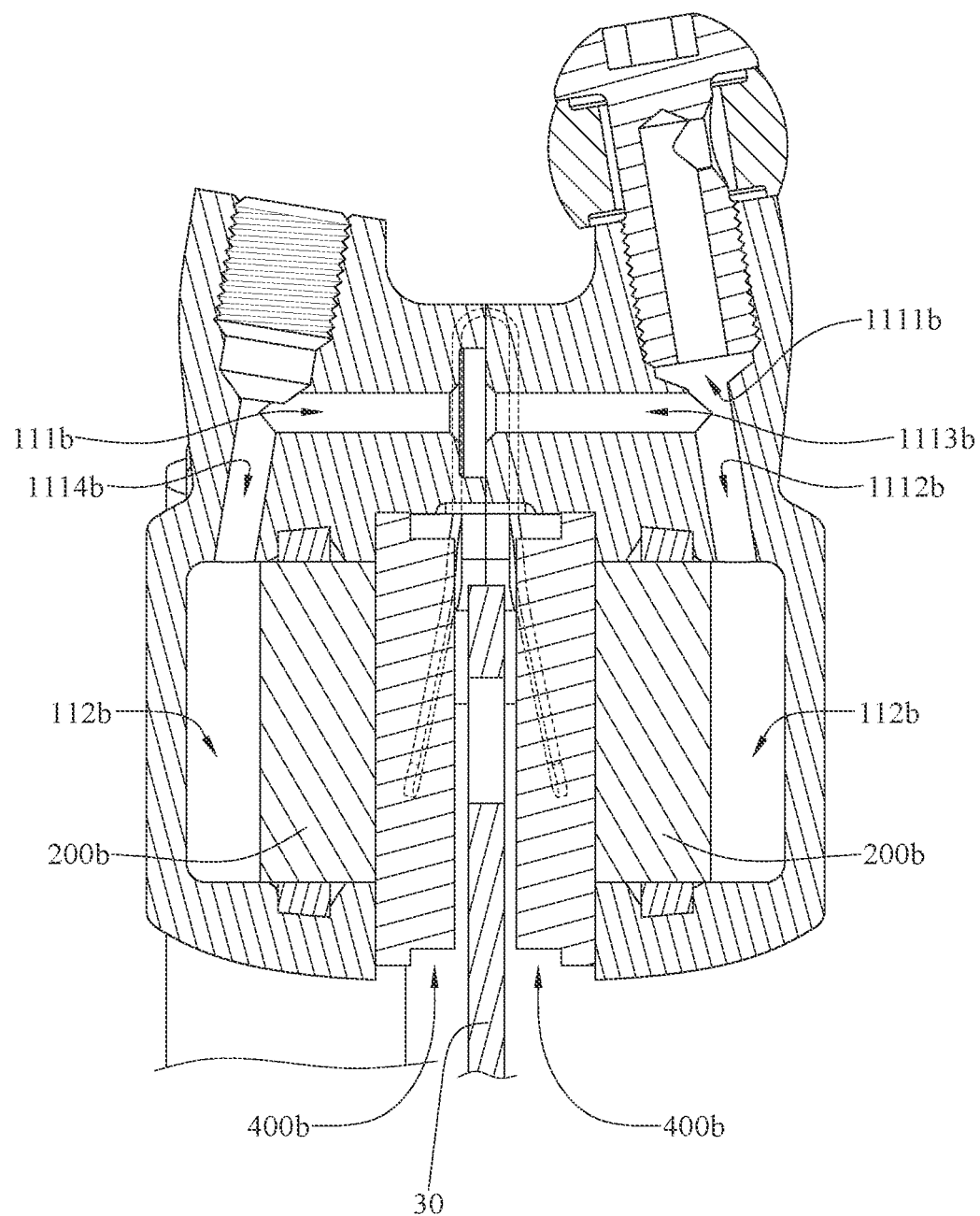
FIG. 10 is a cross-sectional view of the bicycle braking and parking device, the brake disk, and the bicycle fork in FIG. 9 taken along line 10-10.
Figure 11:
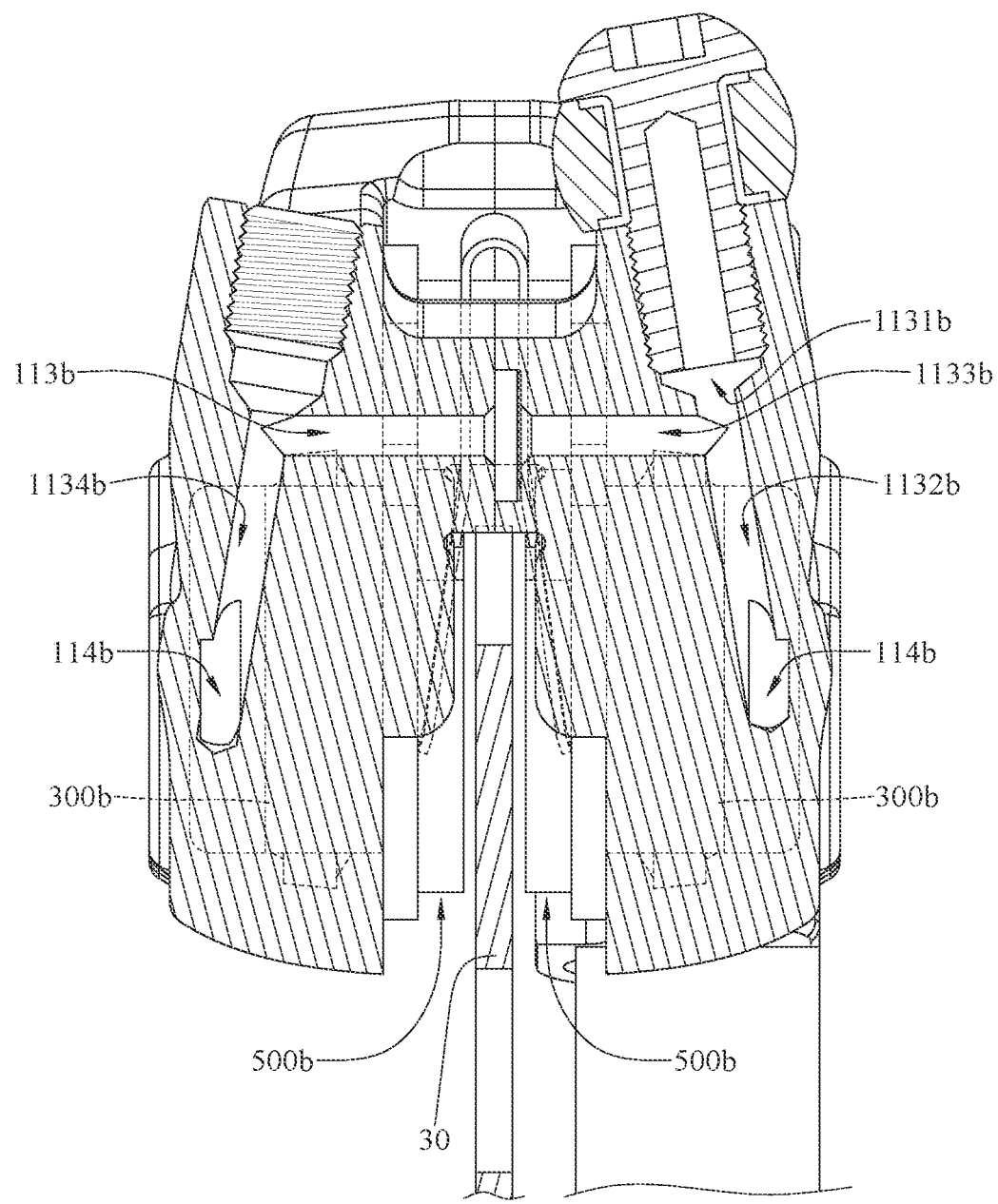
FIG. 11 is a cross-sectional view of the bicycle braking and parking device, the brake disk, and the bicycle fork in FIG. 9 taken along line 11-11.
Figure 12:
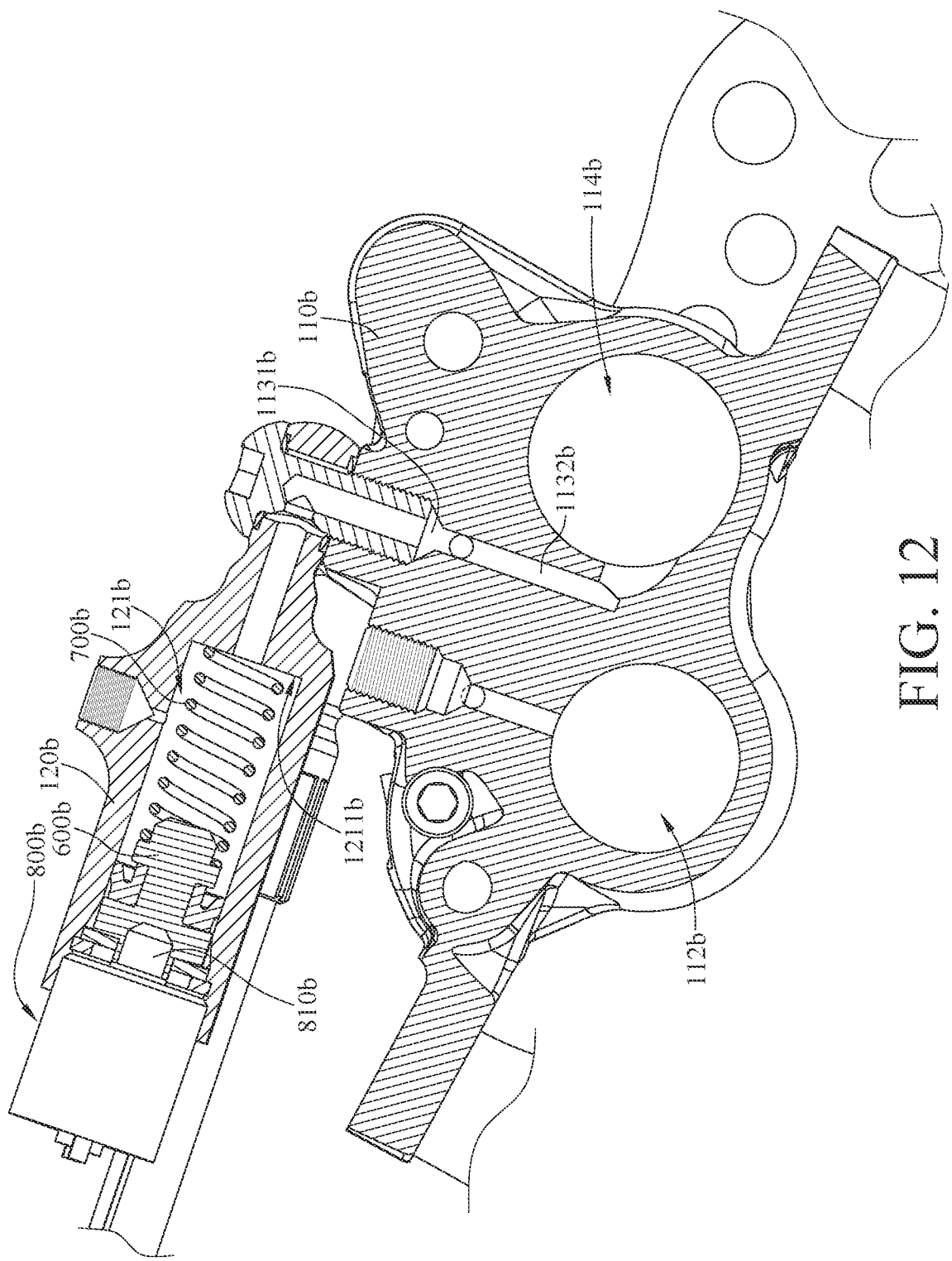
FIG. 12 is a cross-sectional view of the bicycle braking and parking device, the brake disk, and the bicycle fork in FIG. 7.

Then, referring to FIGS. 7 to 12, there are shown a perspective view of a bicycle braking and parking device 10b according to a third embodiment of the disclosure, a brake disk 30, and a bicycle fork, an exploded view of the bicycle braking and parking device 10b, the brake disk 30, and the bicycle fork in FIG. 7, a side view of the bicycle braking and parking device 10b, the brake disk 30, and the bicycle fork in FIG. 7, a cross-sectional view of the bicycle braking and parking device 10b, the brake disk 30, and the bicycle fork in FIG. 9 taken along line 10-10, FIG. 11 is a cross-sectional view of the bicycle braking and parking device 10b, the brake disk 30, and the bicycle fork in FIG. 9 taken along line 11-11, and FIG. 12 is a cross-sectional view of the bicycle braking and parking device 10b, the brake disk 30, and the bicycle fork in FIG. 7.

In this embodiment, the bicycle braking and parking device 10b is configured to clamp a brake disk 30 and connected to a bicycle brake lever (not shown). The bicycle braking and parking device 10b includes a casing 100b, two first pistons 200b, two second pistons 300b, two first brake pads 400b, two second brake pads 500b, and a driving piston 600b. In this or another embodiment, the bicycle braking and parking device 10b may further include an elastic component 700b and an electromagnetic driver 800b.

The casing 100b includes a first part 110b and a second part 120b assembled with each other. The first part 110b has a first inlet channel 111b, two first chambers 112b, a second inlet channel 113b, and two second chambers 114b.

The first inlet channel 111b is in fluid communication with the first chambers 112b. Specifically, the first inlet channel 111b has an inlet portion 1111b and three connection portions 1112b, 1113b, and 1114b. The inlet portion 1111b is in fluid communication with one of the first chambers 112b via the connection portion 1112b, and the connection portion 1112b is in fluid communication with the other one of the first chambers 112b via the connection portions 1113b and 1114b. In this embodiment, the inlet portion 1111b of the first inlet channel 111b is, for example, in fluid communication with the bicycle brake lever via a pipe 40 disposed on the casing 100b.

The second inlet channel 113b is in fluid communication with the second chambers 114b. Specifically, the second inlet channel 113b has an inlet portion 1131b and three connection portions 1132b, 1133b, and 1134b. The inlet portion 1131b is in fluid communication with one of the second chambers 114b via the connection portion 1132b, and the connection portion 1132b is in fluid communication with the other one of the second chambers 114b via the connection portions 1133b and 1134b. The second part 120b has a third chamber 121b, and the third chamber 121b is in fluid communication with the inlet portion 1131b of the second inlet channel 113b.

In this embodiment, the first inlet channel 111b and the first chambers 112b are not in fluid communication with the second inlet channel 113b, the second chambers 114b, and the third chamber 121b.

The first pistons 200b are respectively and movably located in the first chambers 112b, and the second piston 300b are respectively and movably located in the second chambers 114b.

In this embodiment, the bicycle braking and parking device 10b may further includes two insertion pins 900b. The first brake pads 400b are mounted on the first part 110b of the casing 100b via one of the insertion pins 900b, and the first brake pads 400b are located between the first pistons 200b. The second brake pads 500b are mounted on the first part 110b of the casing 100b via the other one of the insertion pins 900b, and the second brake pads 500b are located between the second pistons 300b. The first brake pads 400b can be respectively pushed by the first pistons 200b so as to clamp the brake disk 30. Similarly, the second brake pads 500b can be pushed by the second pistons 300b so as to clamp the brake disk 30.

The driving piston 600b is movably located in the third chamber 121b. The elastic component 700b is located in the third chamber 121b, and two opposite ends of the elastic component 700b respectively press against the driving piston 600b and a bottom surface 1211b of the third chamber 121b. The elastic component 700b is configured to force the driving piston 600b to move away from the bottom surface 1211b of the third chamber 121b. The electromagnetic driver 800b has a driving shaft 810b connected to the driving piston 600b. In this embodiment, the electromagnetic driver 800b is, for example, electrically connected to a parking control switch (not shown).

Therefore, when a bicycle brake lever is squeezed, oil in the pipe 40, the first inlet channel 111b, and the first chambers 112b will be used to cause the first pistons 200b to make the first brake pads 400b act on the brake disk 30.

Figure 13:
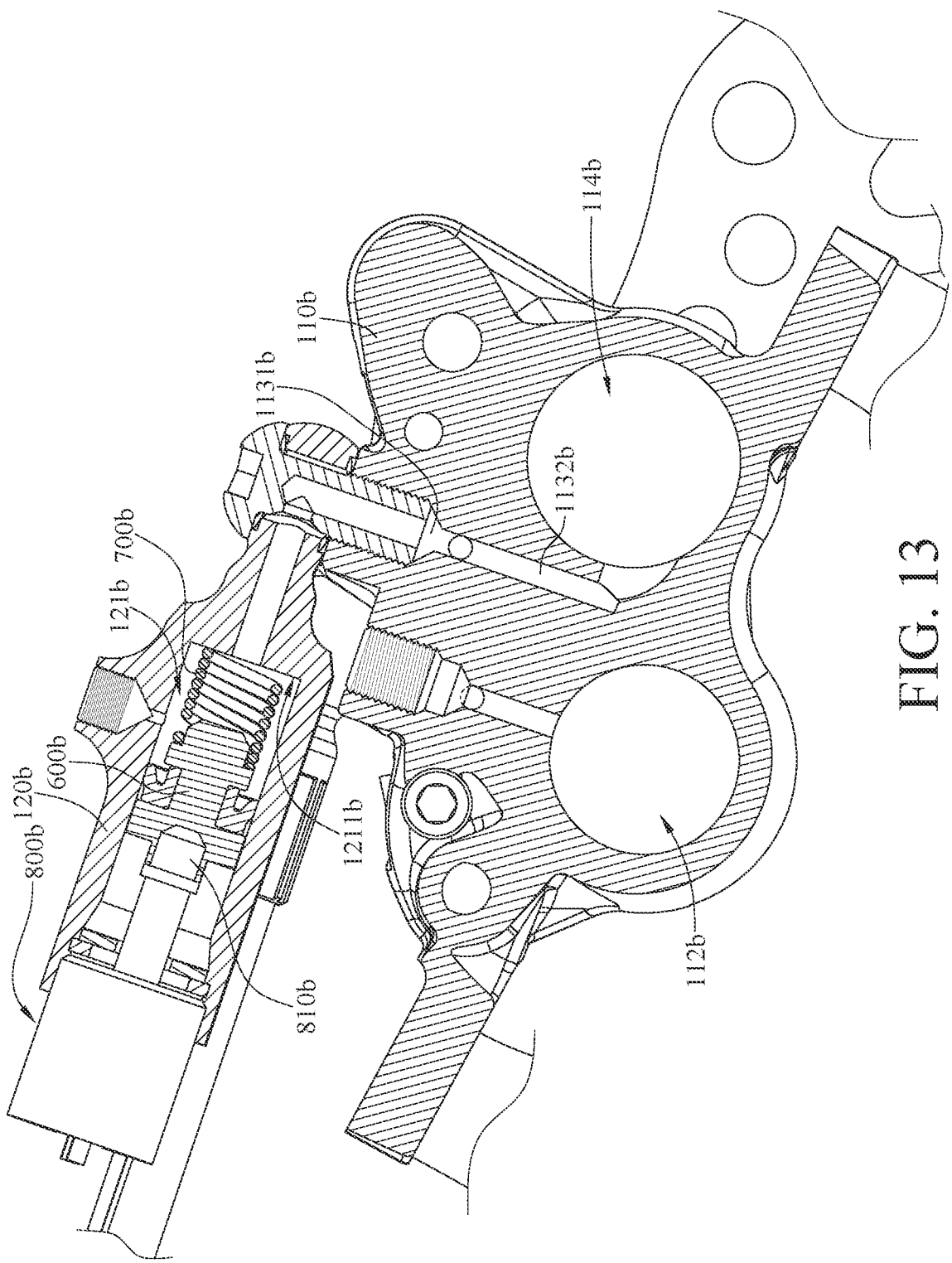
FIG. 13 is a cross-sectional view of the bicycle braking and parking device, the brake disk, and the bicycle fork in FIG. 12 when a driving piston is moved by an electromagnetic driver.
Figure 14:
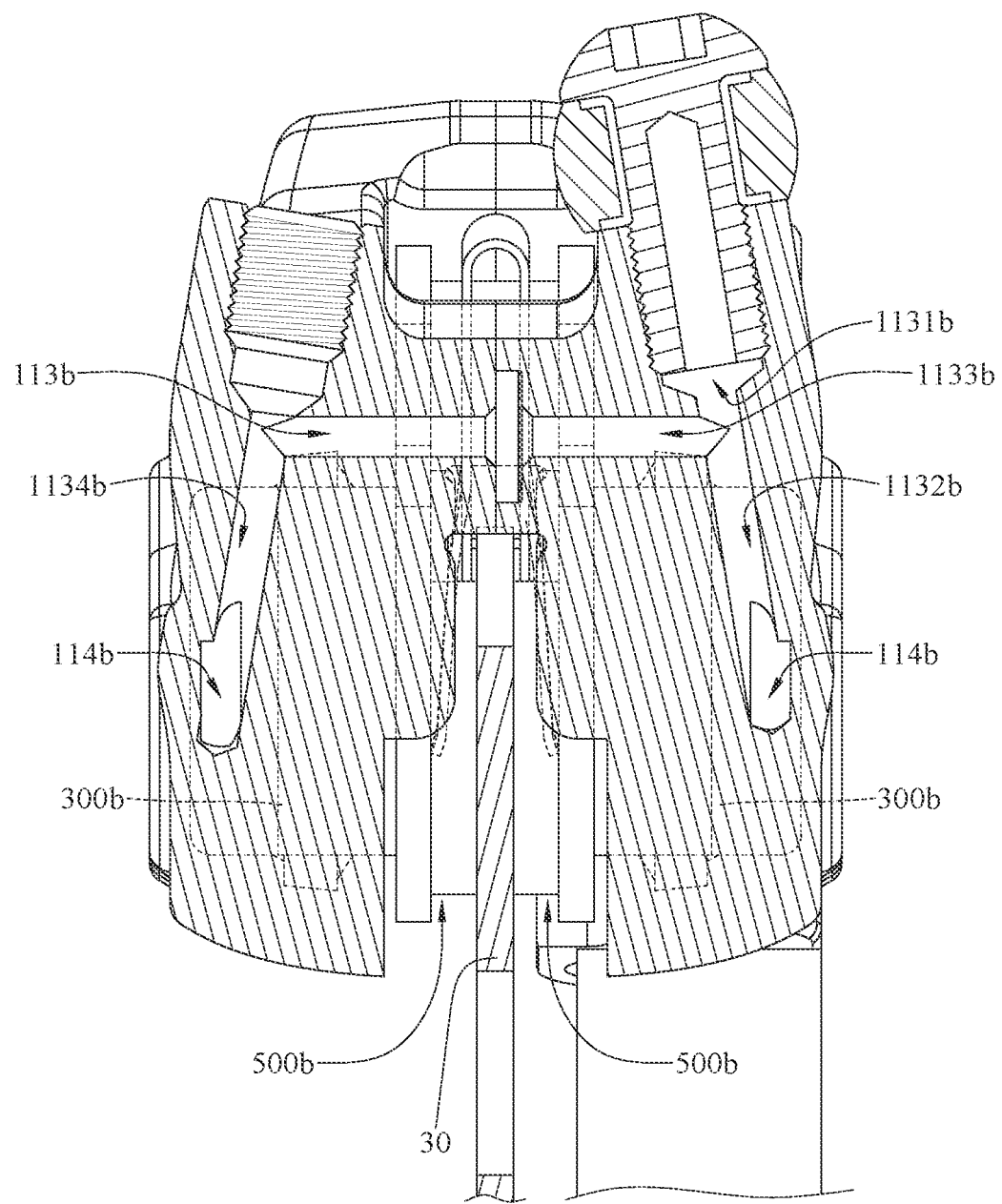
FIG. 14 is a cross-sectional view of the bicycle braking and parking device, the brake disk, and the bicycle fork in FIG. 11 when second brake pads clamp the brake disk.

Then, referring to FIGS. 13 and 14, there are shown a cross-sectional view of the bicycle braking and parking device 10b, the brake disk 30, and the bicycle fork in FIG. 12 when the driving piston 600b is moved by the electromagnetic driver 800b and a cross-sectional view of the bicycle braking and parking device 10b, the brake disk 30, and the bicycle fork in FIG. 11 when the second brake pads 500b clamp the brake disk 30.

When the parking control switch is activated, the driving shaft 810b of the electromagnetic driver 800b moves the driving piston 600b in third chamber 121b of the second part 120b so as to cause the oil in the third chamber 121b, the second inlet channel 113b, and the second chambers 114b to trigger the second pistons 300b, such that the second pistons 300b respectively push the second brake pads 500b and thus causing the second brake pads 500b to clamp the brake disk 30, thereby limiting the motion of the wheel. As a result, when the bicycle is parked on a slope, the second brake pads 500b clamping the brake disk 30 is able to prevent unwanted movement of the wheel even if the brake lever is released.

Note that the electromagnetic driver 800b in other embodiments may be controlled using a mobile device (e.g., a smartphone).

Figure 15:
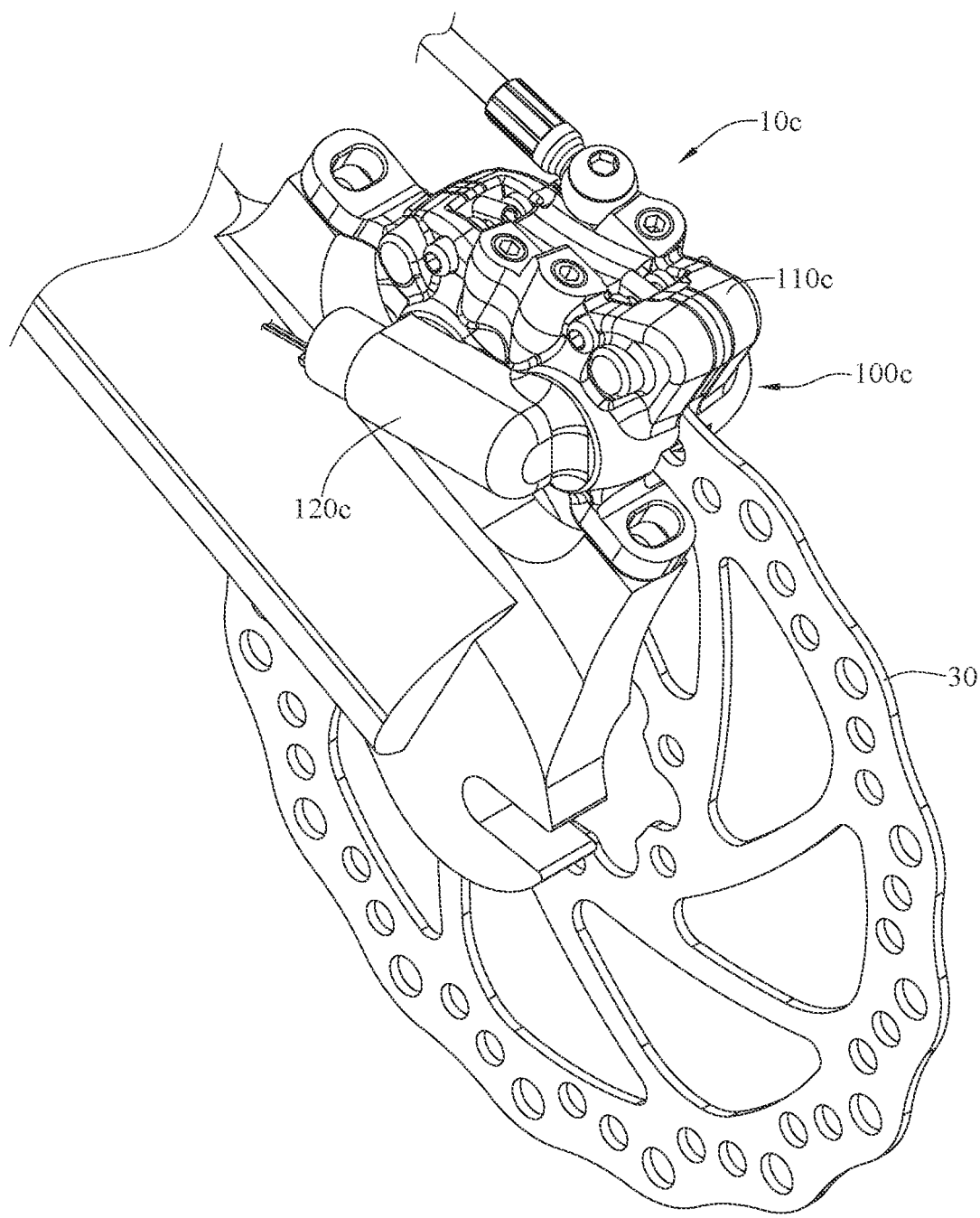
FIG. 15 is a perspective view of a bicycle braking and parking device according to a fourth embodiment of the disclosure, a brake disk, and a bicycle fork.
Figure 16:
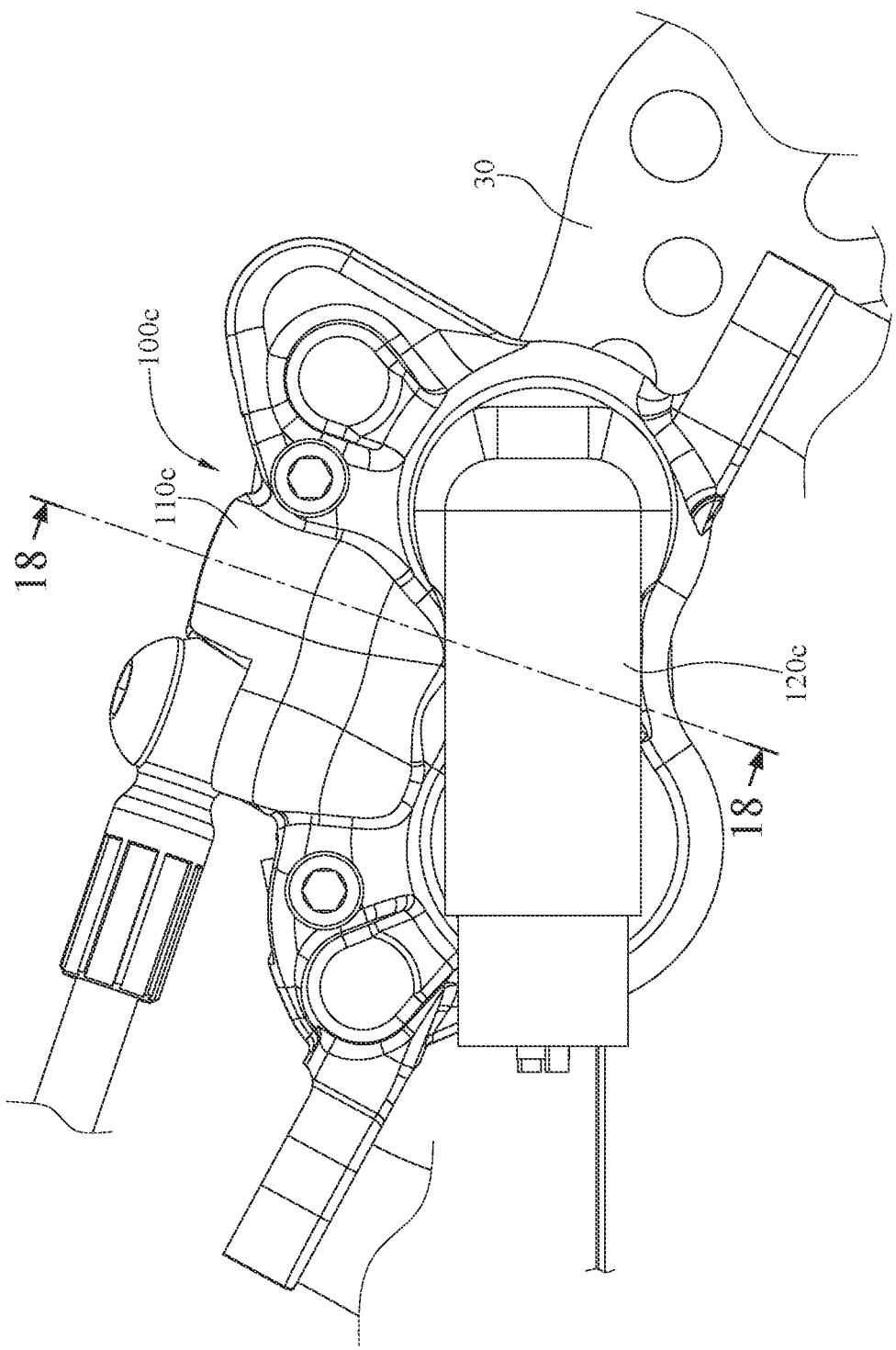
FIG. 16 is a side view of the bicycle braking and parking device, the brake disk, and the bicycle fork in FIG. 15.
Figure 17:
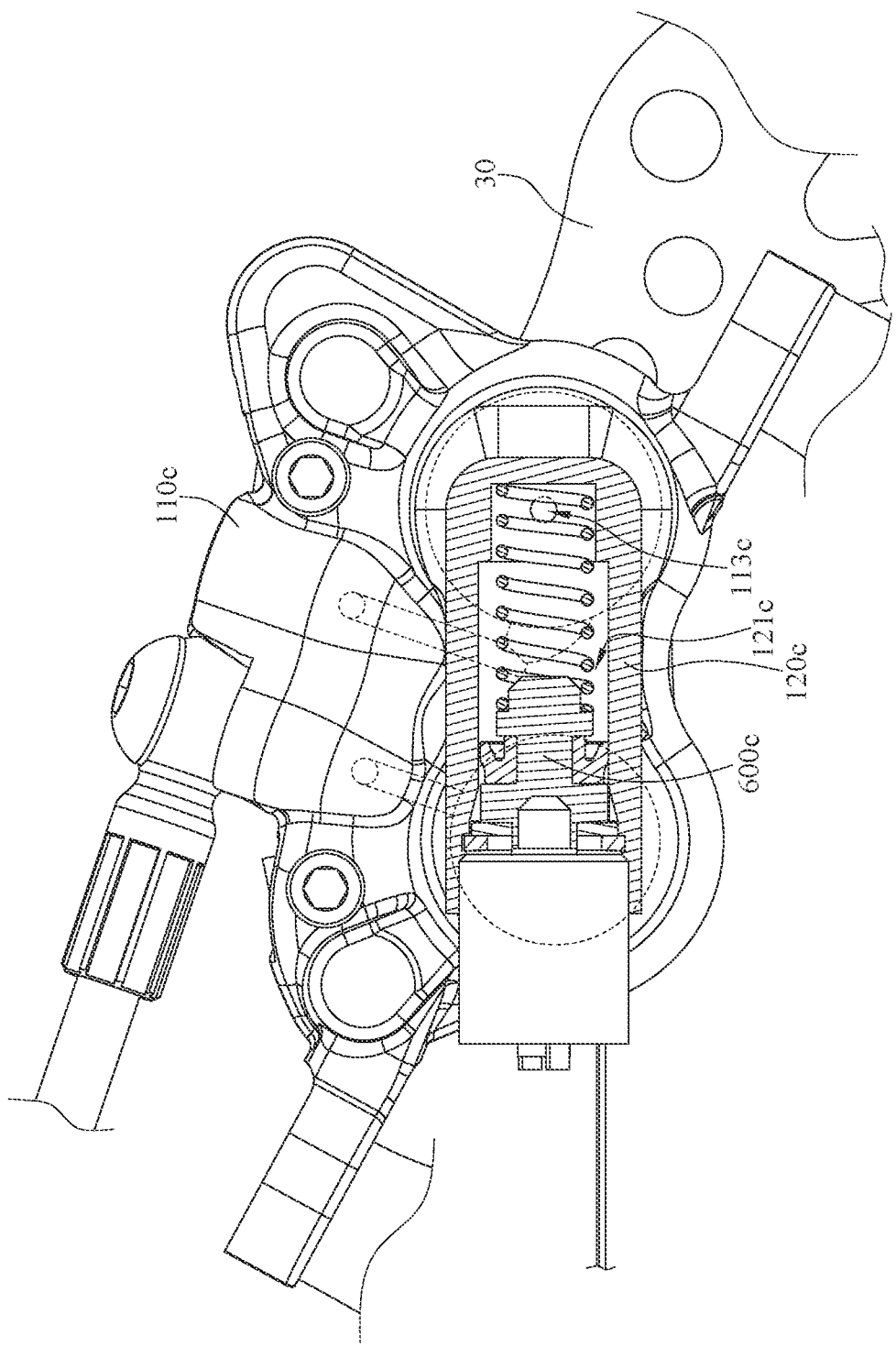
FIG. 17 is a cross-sectional view of the bicycle braking and parking device, the brake disk, and the bicycle fork in FIG. 15.
Figure 18:
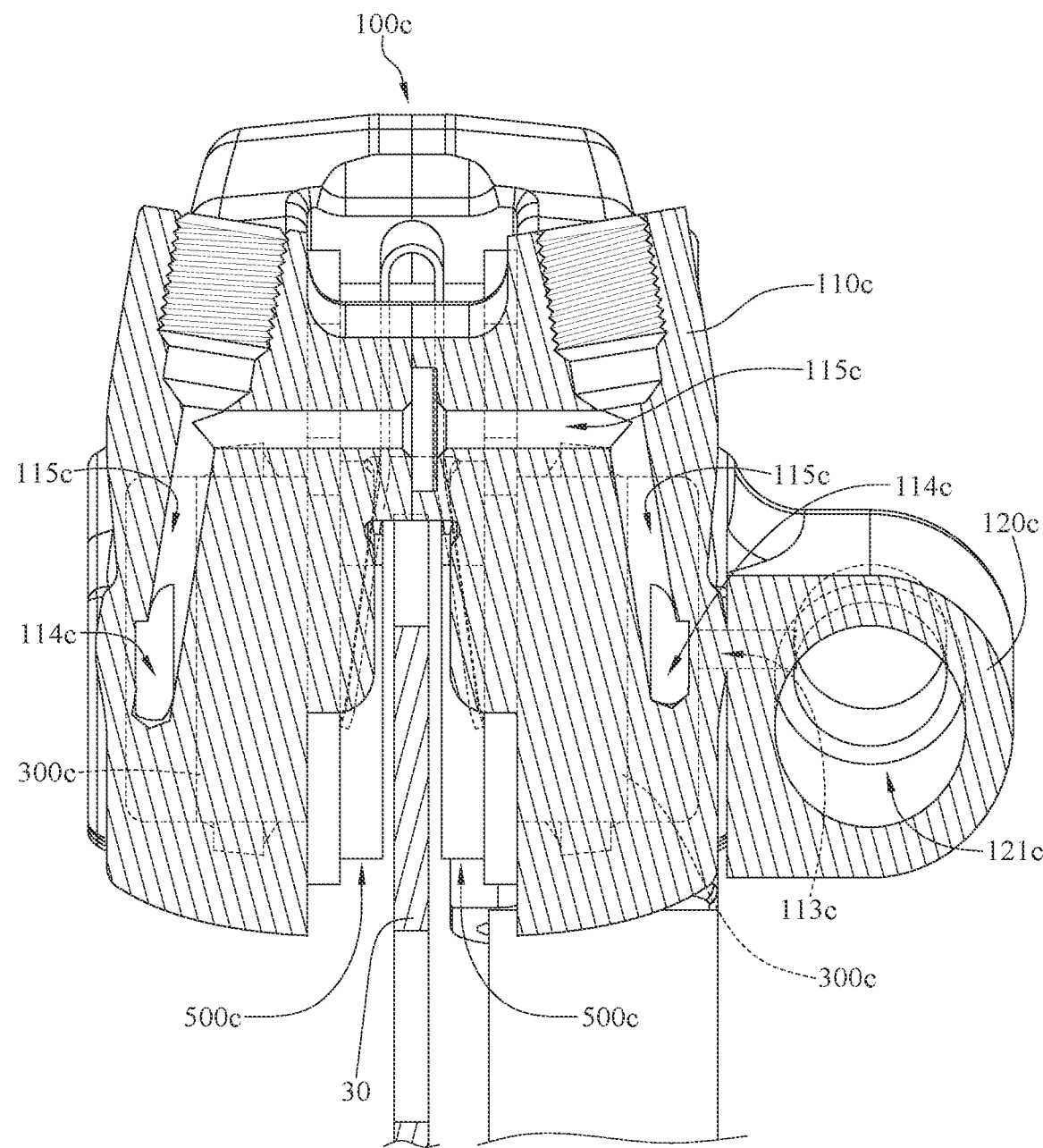
FIG. 18 is a cross-sectional view of the bicycle braking and parking device, the brake disk, and the bicycle fork in FIG. 16 taken along line 18-18.

Then, referring to FIGS. 15 to 18, there are shown a perspective view of a bicycle braking and parking device 10c according to a fourth embodiment of the disclosure, a brake disk 30, and a bicycle fork, a side view of the bicycle braking and parking device 10c, the brake disk 30, and the bicycle fork in FIG. 15, a cross-sectional view of the bicycle braking and parking device 10c, the brake disk 30, and the bicycle fork in FIG. 15, and a cross-sectional view of the bicycle braking and parking device 10c, the brake disk 30, and the bicycle fork in FIG. 16 taken along line 18-18.

In this embodiment, the bicycle braking and parking device 10c is similar to the bicycle braking and parking device 10b discussed in the previous embodiment, thus the following paragraphs mainly relate to the differences between them.

In this embodiment, a first part 110c and a second part 120c of a casing 100c are integrally connected to each other. In addition, two opposite ends of a second inlet channel 113c of the first part 110c are respectively and directly in communication with a third chamber 121c of the second part 120c and one of second chambers 114c of the first part 110c, and the second chambers 114c of the first part 110c are in fluid communication with each other via, for example, a plurality of connection channels 115c.

The driving piston 600c is movably located in the third chamber 121c, and the driving piston 600c is configured to cause oil in the third chamber 121c, the second inlet channel 113c, the connection channels 115c, and the second chambers 114c to trigger the second pistons 300c, such that the second pistons 300c respectively push the second brake pads 500c and thus causing the second brake pads 500c to clamp the brake disk 30.

According to the bicycle braking and parking devices as disclosed in the above embodiments, while the brake lever is released, the motion of the wheel can still be limited by inserting the locking pin through the hollow part of the brake disk or using the driving piston to hold the brake pad. This allows the bicycle parked on a slope to stay stationary even if the brake lever is released.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A bicycle braking and parking device, configured to hold a brake disk, comprising:
   a casing, having an accommodation space and two pistons, wherein the accommodation space is configured to accommodate part of the brake disk, and the pistons are respectively located at two opposite sides of the accommodation space;
   two brake pads, located at the accommodation space and located between the pistons, wherein the pistons are configured to push the brake pads, and the brake pads are configured to clamp the brake disk;
   a locking pin, movably disposed on the casing;
   a push-push mechanism; and
   an electromagnetic driver, configured to force the locking pin to move from a released position to a locked position or from the locked position to the released position via the push-push mechanism;
   wherein when the locking pin is in the released position, the locking pin is configured to be separated from the brake disk; when the locking pin is in the locked position, the locking pin is configured to be inserted into the brake disk so as to limit a motion of the brake disk.

2. The bicycle braking and parking device according to claim 1, wherein the casing comprises a main part and an extension part connected to each other, the main part is configured to be mounted on a bicycle fork, the extension part is configured to be located between a mount portion of the bicycle fork which is assembled with a wheel and the main part, the accommodation space and the pistons are located at the main part, and the locking pin is movably disposed on the extension part.

3. The bicycle braking and parking device according to claim 2, wherein the main part has two tab portions, the tab portions are configured to be fixed to two protrusion portions of the bicycle fork, and the extension part is configured to be located between the protrusion portions of the bicycle fork.

4. The bicycle braking and parking device according to claim 1, wherein the casing includes a main part and an extension part, the main part has two tab portions, the tab portions are configured to mounted on a bicycle fork, the extension part is connected to a side of one of the tab portions located away from the other one of the tab portions, the accommodation space and the pistons are located at the main part, and the locking pin is movably disposed on the extension part.

5. The bicycle braking and parking device according to claim 4, wherein the tab portions are configured to be fixed to two protrusion portions of the bicycle fork, and the extension part is configured to be located at a side of one of the protrusion portions located away from the other one of the protrusion portions.

6. A bicycle braking and parking device, configured to clamp a brake disk and connected to a brake lever, comprising:
   a casing, having a first inlet channel, two first chambers, a second inlet channel, two second chambers, and a third chamber, wherein the first inlet channel is in fluid communication with the first chambers, the second inlet channel, the second chambers, and the third chamber are in fluid communication with each other, the first inlet channel and the first chambers are not in fluid communication with the second inlet channel, the second chambers, and the third chamber, and the first inlet channel is configured to be in fluid communication with the brake lever;
   two first pistons, respective located in the first chambers;
   two second pistons, respectively located in the second chambers;
   two first brake pads, located between the first pistons;
   two second brake pads, located between the second pistons; and
   a driving piston, movably located in the third chamber, wherein the driving piston is configured to cause oil in the third chamber, the second inlet channel, and the second chambers to trigger the second pistons to push the second brake pads to clamp the brake disk.

7. The bicycle braking and parking device according to claim 6, wherein the casing comprises a first part and a second part assembled with each other, the first inlet channel, the first chambers, the second inlet channel, and the second chambers are located at the first part, and the third chamber is located at the second part.

8. The bicycle braking and parking device according to claim 6, wherein the casing comprises a first part and a second part integrally connected to each other, the first inlet channel, the first chambers, the second inlet channel, and the second chambers are located at the first part, and the third chamber is located at the second part.

9. The bicycle braking and parking device according to claim 6, further comprising an electromagnetic driver, wherein the electromagnetic driver is configured to move the driving piston in the third chamber.

* * * * *